MULTIPLE SELECTIVE DEVICE

Filed Oct. 20, 1965 3 Sheets-Sheet 1

EDWARD ROGAL
INVENTOR
BY Ralph W. Bitner
ATTORNEY

Dec. 12, 1967 E. ROGAL 3,357,558
MULTIPLE SELECTIVE DEVICE
Filed Oct. 20, 1965 3 Sheets-Sheet 2
FIG. 3
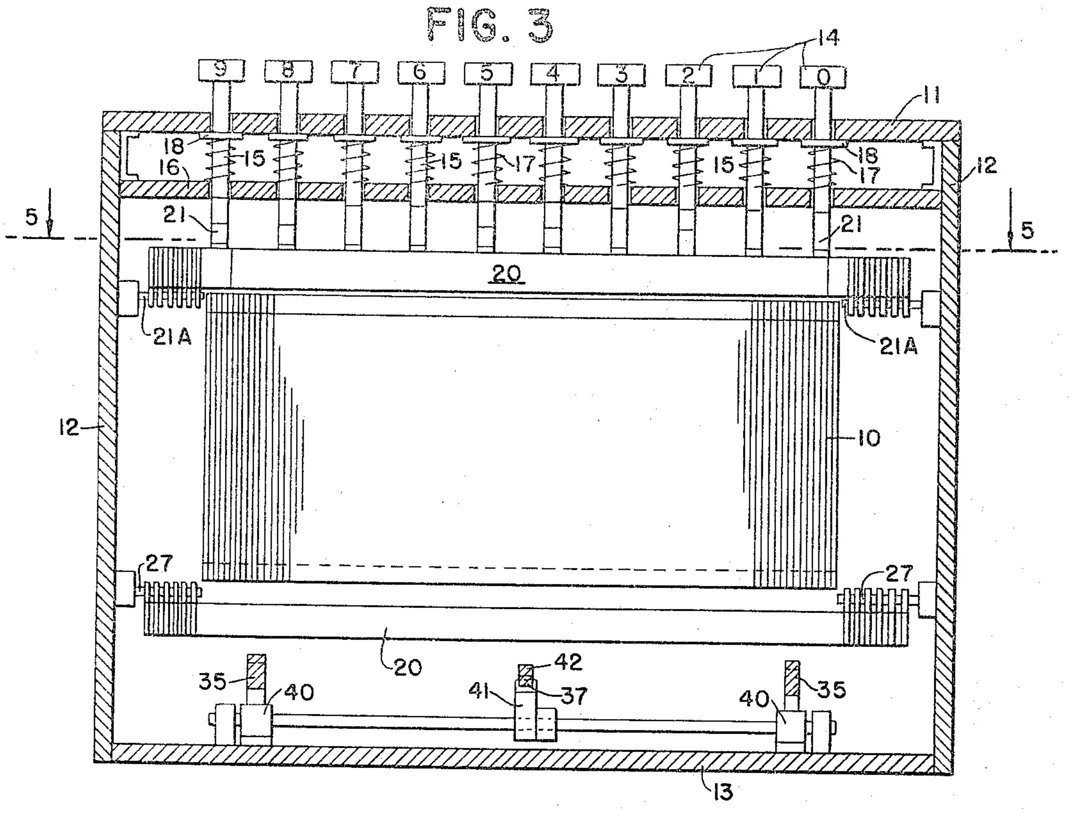
FIG. 4-A
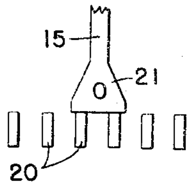
FIG. 4-B
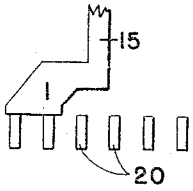
FIG. 4-C
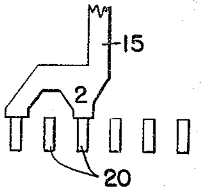
FIG. 4-D
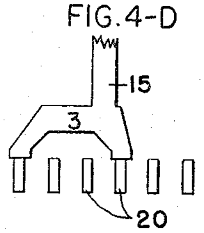
FIG. 4-E
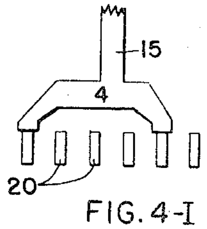
FIG. 4-F
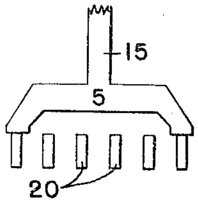
FIG. 4-G
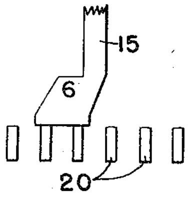
FIG. 4-H
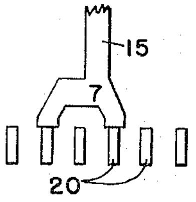
FIG. 4-I
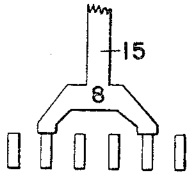
FIG. 4-J
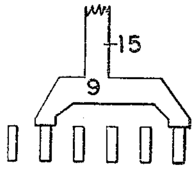
EDWARD ROGAL
INVENTOR
BY Ralph W. E. Bitner
ATTORNEY

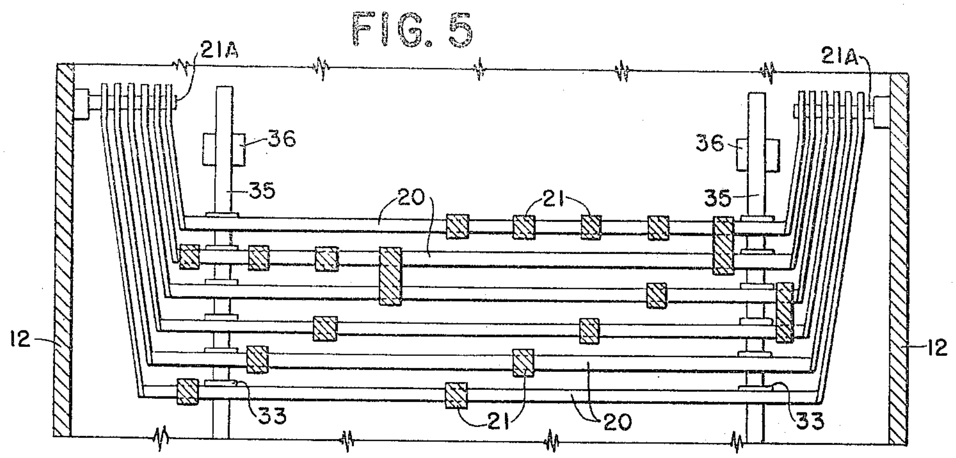
FIG. 5
FIG. 6
| Number | Hundreds | | | | | | Tens | | | | | | Units | | | | | |
|---|---|---|---|---|---|---|---|---|---|---|---|---|---|---|---|---|---|---|
| 1 | ·A | B· | | | | | ·A | B· | | | | | A· | ·B | | | | |
| 2 | ·A | | ·C | | | | ·A | | C· | | | | A· | | C· | | | |
| 3 | ·A | | | D· | | | ·A | | | D· | | | A· | | | D· | | |
| 4 | ·A | | | | E· | | ·A | | | | ·E | | A· | | | | E· | |
| 5 | ·A | | | | | F· | ·A | | | | | F· | A· | | | | | ·F |
| 6 | | B· | ·C | | | | | B· | C· | | | | | ·B | C· | | | |
| 7 | | B· | | D· | | | | B· | | D· | | | | ·B | | D· | | |
| 8 | | B· | | | E· | | | B· | | | ·E | | | ·B | | | E· | |
| 9 | | B· | | | | F· | | B· | | | | F· | | ·B | | | | ·F |
| 0 | | | ·C | D· | | | | | C· | D· | | | | | C· | D· | | |
| First Selection | ↓ | | ↓ | | | | ↓ | | | | ↓ | | | ↓ | | | | ↓ |
| Second Selection | | ↑ | | ↑ | ↑ | ↑ | | ↑ | ↑ | ↑ | | ↑ | ↑ | | ↑ | ↑ | ↑ | |
FIG. 7A, FIG. 7B, FIG. 7C, FIG. 7D
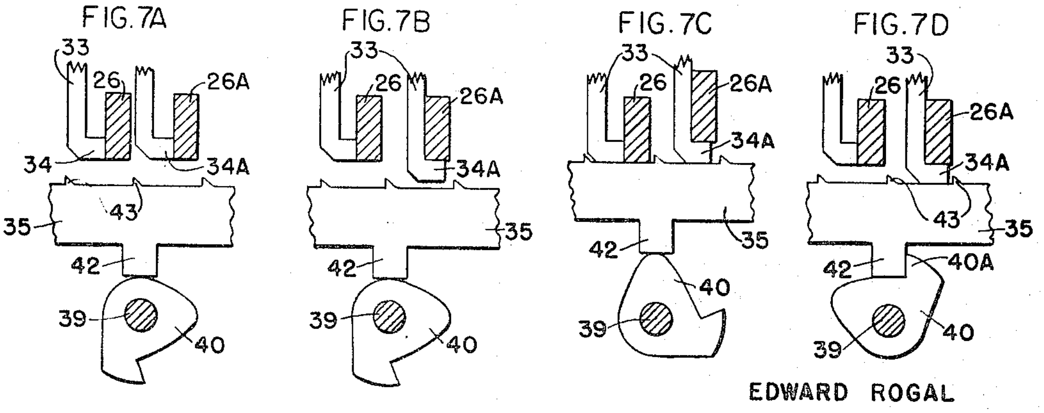
EDWARD ROGAL
INVENTOR
BY Ralph W. E. Bitner
ATTORNEY United States Patent Office 3,357,558
Patented Dec. 12, 1967

3,357,558
MULTIPLE SELECTIVE DEVICE
Edward Rogal, 80 Mann Lot Road,
North Scituate, Mass. 02060
Filed Oct. 20, 1965, Ser. No. 498,935
3 Claims. (Cl. 209—110)

ABSTRACT OF THE DISCLOSURE

A multiple selection device is described which first selects a plurality of articles belonging to a coded set. The selection is made by a two element code represented by cut-out portions on one edge of the articles. Then a second selection is made by a similar selection means operating on cut out portions on a second edge of the coded set. A single article may be selected from a plurality of one thousand articles.

This invention relates to a multiple selection device for selecting one article from a large collection of similar articles. The articles, which may be either card, folders, or any other type of materials containing information, are furnished with a two element information means comprising cut-out portions on two edges of the article. The invention has particular reference to the selection of articles which may be stored in a relatively small space and the desired article moved to one side of the other articles by mechanical means.

There have been many systems for the selection of desired articles which may be mixed together with many other articles having a similar mechanical form. Some of these selection devices operate to select punched data cards in several classes. This selection means requires the removal of the data cards from a storage container and feeding the cards into a sorter, one at a time, until the required card is found. The present invention does not require an additional machine to select a desired article. The cards or folders may be left in their storage compartment and the selection is made by first depressing a series of numbered keys or by operating other similar actuators and then operating one additional rack member and the card or folder is made available.

One of the objects of this invention is to provide an improved selection device which avoids one or more of the disadvantages and limitations of prior art arrangements.

Another object of the invention is to select a desired article from a large variety of similar articles by a simple mechanical operation.

Another object of the invention is to select a desired article from a random distribution of articles.

Another object of the invention is to make a selection of a desired article by pure mechanical means, thereby dispensing with electric, magnetic, and photoelectric sensing or operating devices.

Another object of the invention is to reduce the cost of selection devices.

The invention comprises a container for storing a large plurality of articles each of which is provided with a two element coded representation on two of its edges. The articles are generally stored in parallel relationship so that one may be removed by a sliding action after the selection device has been operated. When the coded cut-out portions are formed in the upper and lower edges of an article, the first selection is made by depressing a first series of articles into a transfer position by action on the coded surfaces. Next, a second selection is made by a coding selection means which operates on coded portions on the lower edges of the articles. This action moves all the articles from the transfer position back to the normal position except for the desired article which remains in the selection position. The desired article may then be removed from all the other articles by mechanical or manual means. From the description which follows it will be obvious that the coded notches and projections can be positioned on any two of the edges of the articles.

One feature of the invention includes a coded arrangement whereby the projections on one edge of any article corresponds with the notches cut in the other edge of the article.

For a better understanding of the present invention, together with other and further objects thereof, reference is made to the following description taken in connection with the accompanying drawings.

FIG. 3 is a cross sectional view of the storage container shown in FIGS. 1 and 2 and is taken along line 3—3 of FIG. 2.

Figure 1:
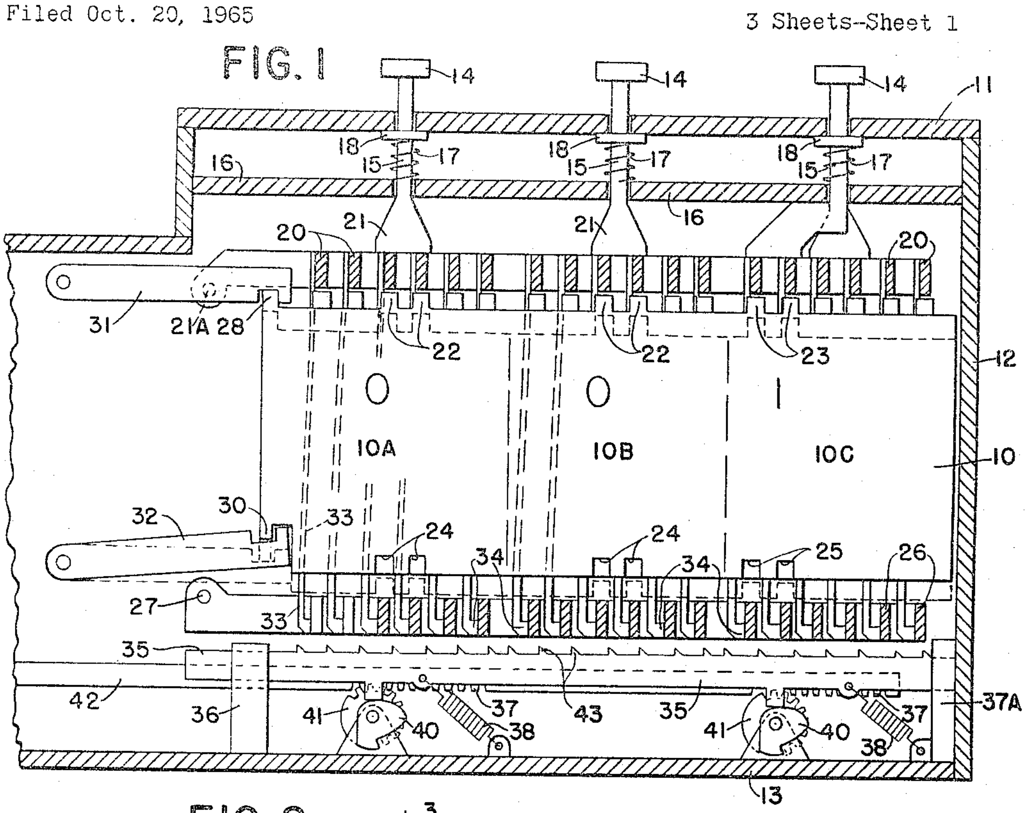
FIG. 1 is a cross sectional view of the storage container showing the selection keys, the cards, and the other selection components employed to select one card out of a thousand. This cross sectional view is taken along line 1—1 of FIG. 2.
Figure 2:
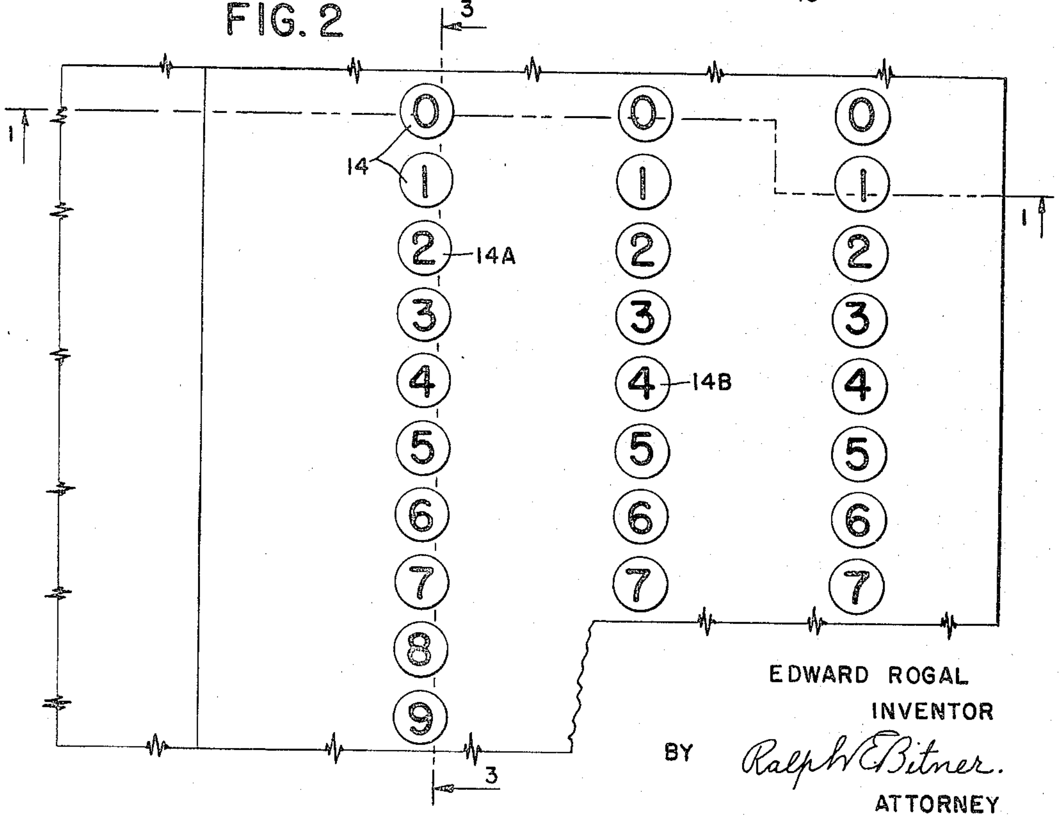
FIG. 2 is a top view of the card selection device showing three rows of digital keys.

FIGS. 4–A to 4–J are a series of side views showing how a particular code may be coupled between a set of digital keys and six operating rods.

FIG. 5 is a partial cross sectional view of the device shown in FIG. 3 and is taken along line 5—5 of that figure.

FIG. 6 is a table indicating the code used on the cards which are to be selected.

FIGS. 7A to 7D are a series of four detailed views, to an enlarged scale, showing the various operating positions of the spring interponents secured to the upper key rods.

Referring now to the figures, a plurality of cards 10 (a maximum of one thousand) is stored in a container having a top panel 11, a side wall 12, and a base member 13. A plurality of digital keys 14 are mounted above the panel 11 and are connected to shafts 15 which extend downwardly through the top panel and through a sub-panel 16. A set of springs 17 urges the keys upwardly and a plurality of washers 18 act as stops to keep the keys in their normal unactuated position. The base of each key shaft is secured to a coded extension 21 which is designed to actuate a set of rods 20 which are coupled to a pivot 21A and are depressed whenever a corresponding key is depressed.

FIGS. 4–A to 4–J show one of the codes which may be used with such a selection device. Many other codes, including the binary code, may be employed. It should be noted that each key operates on two and only two bars 20, the extent and the shape of the shaft extensions 21 determining the particular code employed. The code is explained further in the table shown in FIG. 6 where each of the vertical columns represents one of the six coded positions.

The articles 10 for selection in this example are thin flat paper cards used in card catalogs and the selection components are designed specifically to operate on this class of articles. Each card 10 is divided into three main areas 10A, 10B, and 10C, each area representing a denominational order in the decimal system. In FIG. 1 the area 10A is for hundreds and the extensions 22 on the upper edge representing the numeral "0". The same extensions 22 are on the upper edge of area 10B and represent the tens order for the same numeral and the extensions 23 on the upper edge of 10C represent a "1" in the units order. It will be noted that at the bottom edge there are notches 24 at the lower edge of areas 10A and 10B and two notches 25 at the lower edge of area 10C, these notches being in the same relative position as the extensions on the upper edge. Reference to the table in FIG. 6 and the drawing in FIG. 4 show these coded positions and, in addition, show the position of extensions and notches which would be used to represent other digital values.

At the lower edge of cards 10 another plurality of bars 26 is positioned, these bars being pivoted about a common pivot 27. The bars 26 are in the six positions which would be occupied by notches 24 if they were cut out above the rods to represent a digit value. Cards 10 are also formed with an upper extension 28 and a lower extension 30, these extensions being employed to maintain the cards in an unactuated position and to withdraw a desired card after a double selection has been made. Extension 28 fits into a notch on a lever 31 while the lower extension 30 fits into a notch on a lower lever 32.

The upper rods 20, which are operated by the lower extensions 21 of keys 14, are provided with spring extensions 33 extending downwardly on either end of the card pack and terminating in an offset portion 34 which acts as an interponent when the upper rods are actuated. Extensions 33 are made of flat spring material and their lower portions 34 are resiliently urged against the bottom portion of the lower rods 26. When any of the rods 20 are actuated by the depression of a key 14, the interponent portion 34 of the springs is pushed downwardly and snaps over the lower edge of rods 26. This action is explained in detail later when reference is made to FIG. 7.

Below rods 26 are two sliding racks 35 which are held in position by two bearings 36 and 37A. Portions of each rack contain teeth 37 and two springs 38 pull the racks to the right as shown in FIG. 1 and also urge them in a downward direction. Bearings 36 and 37A contain slots in which the racks 35 slide, these slots being open at the top so that the racks may be pushed upwardly by two cams 40 at the end of a selection operation. The operation involving the cams 40, rotated by a pinion 41 and a rack 42, is described in detail later when reference to FIG. 7 is made. The first rack 35 is formed with a plurality of teeth 43 which serve in a dual capacity. First, when the interponents 34 are lowered, the right hand surface of the teeth prevent the interponent ends from moving to the left. After the interponents have been positioned below rods 26, rack bar 35 is pushed upwardly by cams 40 to raise all the bars 26 having interponents below them. This action makes the final, second selection. An additional rotation of cams 40 moves the rack 35 to the left as viewed in FIG. 1 and the interponents 34 are also moved to the left so that they regain their normal position.

The chart shown in FIG. 6 illustrates the type of code used to punch the slots in the upper and lower edges of the card. Let it be assumed that card 249 is desired. Key 14A in the hundreds column is depressed along with key 14B in the tens column and the nine key in the units column. When this is done, all the cards having hundreds extensions in the first and third rows are lowered. All the cards having tens extensions in the first and fifth rows are also lowered and the cards having extensions in the second and fourth units area are lowered. At the same time that the upper rods 20 push the first selected cards downwardly, interponents 34 coupled to these same upper rods are also lowered and spring under the lower edge of the lower rods 26. The second phase of the selection is made by the operator or an automatic mechanism which moves the second rack 42 to the left as shown in FIG. 1 and moves rack 35 upwardly to operate on rods 26 and then to normalize the interponents 34. After this, the second rack 42 is returned to its original position and the selected card having a number 249 is the only card which remains in its lowered position. The second selection is made by raising the lower bars 26 and only the single card having the same cut-out portions 24 corresponding to extensions 22 will remain in its lowered position.

A study of the chart shown in FIG. 6 indicates that all the cards having letters in the columns represented by the arrows pointing downward will be lowered in the first selection operation. This group includes all the cards having upper extensions A and C (representing code 2) in the hundreds area and comprises 1, 2, 3, 4, 5, 6, and 0 hundreds values.

In a similar manner, all the cards having extensions A and E (representing code 4) in the tens area are lowered. This group comprises ten groups 1, 2, 3, 4, 5, and 8. Also, all cards having extensions B and F (representing code 9) in the units area are lowered. This group comprises all unit numbers of 1, 5, 6, 7, 8, and 9. In FIG. 6, all card extensions causing a downward movement have been marked with a small dot to the left of the extension letter.

The second selection operates on all the cards which do not have slots in the positions indicated by the arrows pointing up. These cards are moved back to their normal position. The result is a single card remaining in the lowered position. During this second selection, cards having hundreds numbers of 1, 3, 4, 5, 6, 7, 8, 9, and 0 are moved back. Cards having tens numbers of 1, 2, 3, 5, 6, 7, 8, 9, and 0 are also moved back. And the units cards having all values except 9 are also normalized. This action leaves only the desired card, number 249 in its lowered position. In FIG. 6, all cards moved back by the second selection operation have been marked by a small dot to the right of the slot letter.

Removal of the card selected may be made by manual means or may be withdrawn by lever 32 which at this point is coupled only to the selected card. A mechanism (not shown) pulls lever 32 and the card to the left as shown in FIG. 1 to a position where it may be removed for other purposes.

Referring now to FIGS. 7A to 7D, a detailed showing is presented for explaining the operation of interponents 34, the lower rods 26, and the first rack 35. FIG. 7A shows all components in their normal position. FIG. 7B shows the second interponent 34A lowered and positioned beneath rod 26A. This is the disposition of components at the end of the first selective operation. As stated above, interponent 34A has been lowered by a key 14 and the upper rod 20 coupled to it. Next, rack member 42 is pulled to the left as shown in FIG. 1 and shaft 39 is rotated so that cam 40 operates to lift rack 35 and make contact with interponent 34A, thereby lifting rod 26A. The other rods 26 are not moved. This action, as shown in its completed form in FIG. 7C, completes the second selection of the cards. As cam 40 rotates still farther, as shown in FIG. 7D, a portion of the cam 40A makes contact with an extension 42 of rack 35 and one of the teeth 43 on the top edge of the rack moves against the lower interponent 34A and moves it to the left, thereby normalizing it and moving all the selection components into their normal position. Cam 40 may now be normalized by returning the second rack 42 to its normal position. At this point the selection device is ready for another sequence of operations.

The foregoing description has been directed to a collection of one thousand articles and three denominational order selection units. It is obvious that the device may be extended to a collection of ten thousand articles and four selection units or reduced to one hundred articles and two selection units. The disclosure and drawings are illustrative of the principles of the invention and are not to be interpreted in a limiting sense. The only limitations are to be determined from the scope of the appended claims.

What is claimed is:

1. An article selection device for displacing a desired article to a unique position relative to a plurality of other similar articles comprising; a plurality of articles normally mounted adjacent to each other, each in a uniform position; similar articles comprising; a series of coded extensions on a first edge of each article; a similar series of coded notches on a second edge of each article; a series of selection actuators for designating the desired article, said actuators each coupled to two of a first series of bars for making contact with two of said extensions and for moving some of the articles to a transfer position, said selection actuators also coupled to two of a second series of bars for making contact with the second edge of the transferred articles to return them to their original position, leaving the desired article in the transfer position and a normalizing means coupled to all the bars for returning them to their normal unactuated position, said normalizing means including a double rack positioned under the articles and formed with extensions which engage all the actuated bars.

2. An article selection device as claimed in claim 1 wherein said selection actuators are each coupled to a manually operable key marked with an identifying character.

3. An article selection device as claimed in claim 1 wherein said first series of bars are moved by manually operable keys during a first time interval and said second series of bars are moved by a cam during a second time interval which starts after the conclusion of the first time interval.

References Cited

UNITED STATES PATENTS

| | | | |
|---|---|---|---|
| 2,090,635 | 8/1937 | Nevin | 129—16.1 |
| 2,528,161 | 10/1950 | Miloche | 209—110 X |
| 3,225,770 | 12/1965 | Lasley | 209—110 X |

M. HENSON WOOD, Jr., *Primary Examiner.*

R. A. SCHACHER, *Assistant Examiner.*